US008923936B2

(12) United States Patent
Koh et al.

(10) Patent No.: US 8,923,936 B2
(45) Date of Patent: Dec. 30, 2014

(54) MOBILE TERMINAL AND IMAGE DISPLAY METHOD FOR THE SAME

(75) Inventors: Myung Geun Koh, Yongin-si (KR); Yi Kyu Min, Yongin-si (KR); Kyung Goo Lee, Seoul (KR); Byoung Il Son, Suwon-si (KR); Sung Ho Kim, Gwangmyeong-si (KR); Eun Jeong Kwon, Seoul (KR); Won Joon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 13/194,006

(22) Filed: Jul. 29, 2011

(65) Prior Publication Data

US 2012/0046080 A1    Feb. 23, 2012

(30) Foreign Application Priority Data

Aug. 19, 2010  (KR) .................. 10-2010-0080321

(51) Int. Cl.
  *H04M 1/00* (2006.01)
  *H04M 1/02* (2006.01)
  *H04B 1/38* (2006.01)
  *H04M 1/725* (2006.01)
(52) U.S. Cl.
  CPC ........... *H04M 1/0283* (2013.01); *H04B 1/3888* (2013.01); *H04M 1/72544* (2013.01)
  USPC ............... 455/575.8; 455/566; 455/550.1; 455/575.1

(58) Field of Classification Search
  CPC ............ H04M 1/0283; H04M 1/0206; H04M 1/72544; H04B 1/3888
  USPC ................... 455/566, 550.1, 575.1, 575.8
  See application file for complete search history.

(56) References Cited

U.S. PATENT DOCUMENTS

| 6,608,996 | B1 | 8/2003 | Laurikka et al. |
| 7,529,364 | B2 | 5/2009 | Buehler |
| 7,805,172 | B2 * | 9/2010 | Joo ............................ 455/575.8 |
| 2010/0270189 | A1 * | 10/2010 | Pedersen et al. ............. 206/320 |

FOREIGN PATENT DOCUMENTS

JP        2000-231333 A      8/2000

* cited by examiner

*Primary Examiner* — Khai M Nguyen
(74) *Attorney, Agent, or Firm* — Jefferson IP Law, LLP

(57) ABSTRACT

A mobile terminal and method for supporting an image display are provided. The mobile terminal includes a display unit for outputting images according to an operation of the mobile terminal, an exterior case for enclosing the display unit, a film layer arranged so as to cover the display unit and the exterior case, and including an image printed in an area thereof excluding a region corresponding to the display unit, a storage unit for pre-storing screen images that are associated with the image printed on the film layer and are to be output to the display unit according to the operation of the mobile terminal, and a control unit for controlling an operation to output the screen images stored in the storage unit to the display unit.

8 Claims, 4 Drawing Sheets

MOBILE TERMINAL AND IMAGE DISPLAY METHOD FOR THE SAME

PRIORITY

This application claims the benefit under 35 U.S.C. §119 (a) of a Korean patent application filed on Aug. 19, 2010 in the Korean Intellectual Property Office and assigned Serial No. 10-2010-0080321, the entire disclosure of which is hereby incorporated by reference.

BACKGROUND OF THE INVENTION

1. Field of the Invention

The present invention relates to image output of a mobile terminal. More particularly, the present invention relates to a mobile terminal and an image display method for the same wherein particular images can be displayed in a more organized manner using not only the display unit but also the whole space of a specific surface of the mobile terminal.

2. Description of the Related Art

With rapid technical advances, mobile terminals can now support not only basic voice calls and short text messages but also various other functions related to video calls, electronic schedulers, the Internet, etc. To support such functions, mobile terminals have employed more advanced forms of hardware and software. That is, mobile terminals are designed to execute diverse application programs on the basis of powerful hardware devices.

Due to portability requirements, a mobile terminal has size limitations with regard to the display unit. Many approaches have been proposed to increase the size of the display unit. However, as the size of the display unit increases, the weight of the mobile terminal also increases. Hence, it is difficult to significantly increase the size of the display unit without unacceptably impacting the portability of the mobile terminal. The mobile terminal has a case, enclosing the outside of the display unit, in which various necessary components are installed. To accommodate the display unit, the case has a space of a given width while enclosing the border of the display unit.

In an existing mobile terminal, the display unit has the above-described size limitations, and screen images may only be output within the display unit. Hence, it is necessary to develop a means for displaying images in a more organic and sensible manner through utilization of an available space of the mobile terminal.

SUMMARY OF THE INVENTION

Aspects of the present invention are to address at least the above-mentioned problems and/or disadvantages and to provide at least the advantages described below. Accordingly, an aspect of the present invention is to provide a mobile terminal and an image display method for the same wherein a specific image is arranged on an entire space of one surface of the mobile terminal so as to support more efficient utilization of a display space and enable more sensible and organic screen output through the display unit.

In accordance with an aspect of the present invention, a mobile terminal for supporting image display is provided. The terminal includes a display unit for outputting images according to an operation of the mobile terminal, an exterior case for enclosing the display unit, a film layer arranged so as to cover the display unit and the exterior case and including an image printed in an area thereof excluding a region corresponding to the display unit, a storage unit for pre-storing screen images that are associated with the image printed on the film layer and are to be output to the display unit according to operation of the mobile terminal, and a control unit for controlling an operation to output the screen images stored in the storage unit to the display unit.

In accordance with another aspect of the present invention, a method for supporting an image display in a mobile terminal is provided. The method includes providing a film layer including a printed image to a surface of the mobile terminal at which a display unit is arranged, identifying an operating state of the mobile terminal after providing the film layer, and outputting a screen image associated with the image printed on the film layer according to the identified operating state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
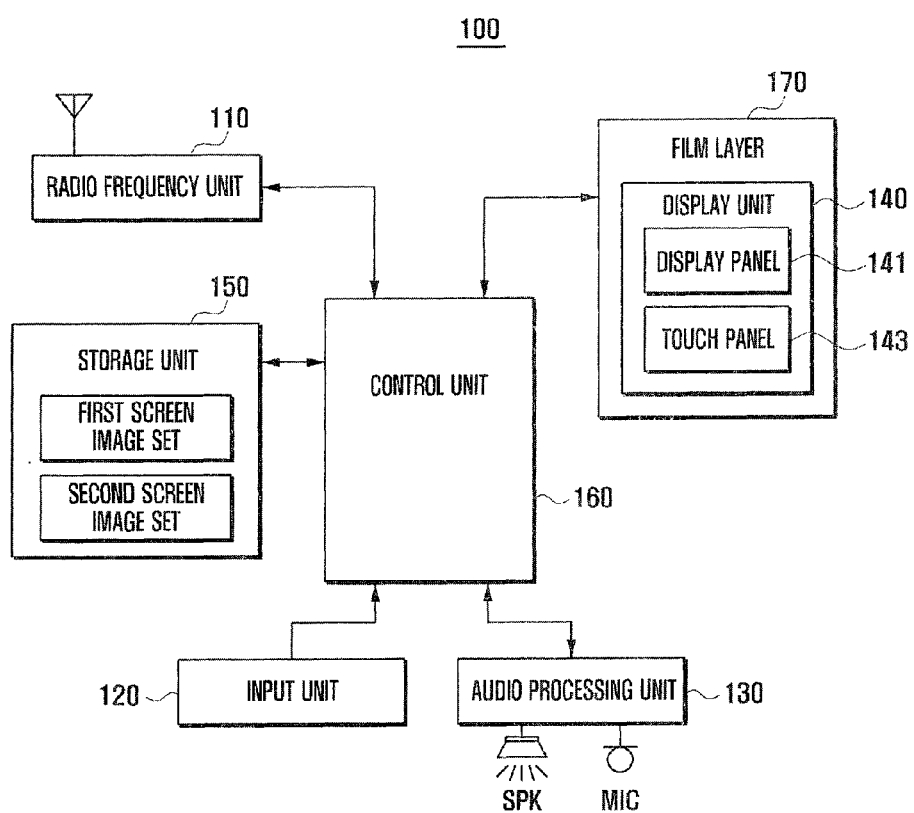
FIG. 1 is a block diagram of a mobile terminal according to an exemplary embodiment of the present invention.

FIG. 1 is a block diagram of a mobile terminal according to an exemplary embodiment of the present invention. Only components necessary for the description of exemplary embodiments of the present invention are shown in FIG. 1.

Referring to FIG. 1, the mobile terminal 100 includes a radio frequency unit 110, an input unit 120, an audio processing unit 130, a display unit 140, a storage unit 150, and a control unit 160. A film layer 170 may be arranged on the display unit 140.

In an exemplary embodiment of the present invention, the mobile terminal 100 having the above configuration is designed so that the screen image on the display unit 140 may be combined with the image arranged on the film layer 170. During utilization of the mobile terminal 100, the user may view the screen image displayed on the display unit 140 and the image arranged on the film layer 170 as a single connected image. Hence, the user may view images in a more extended space and intuitively understand the meaning of the images. Next, individual components will be described in more detail.

The radio frequency unit 110 establishes a communication channel for voice, video, and data communication under the control of the control unit 160. That is, the radio frequency unit 110 establishes a communication channel for a voice call, a data call, and a video call to a mobile communication system. To achieve this, the radio frequency unit 110 may include a radio frequency transmitter for upconverting a frequency of a signal to be transmitted and amplifying the signal, and a radio frequency receiver for low-noise amplifying a received signal and downconverting a frequency of the received signal. The radio frequency unit 110 may receive data through an established channel and output the received data to the display unit 140 under control of the control unit 160. The radio frequency unit 110 may receive various data from the outside according to user manipulation and forward the received data to the storage unit 150 under control of the control unit 160. In particular, when a call connection request signal is received from the outside, the radio frequency unit 110 may forward the received call connection request signal to the control unit 160. Then, the mobile terminal 100 may display a screen image on the display unit 140 after reception of the call connection request signal. Here, the screen image displayed on the display unit 140 may be visually associated with the image arranged on the film layer 170. The mobile terminal 100 may transmit a call connection request signal to another mobile terminal through the radio frequency unit 110 in response to a user request. Then, the mobile terminal 100 may display a screen image on the display unit 140 after transmission of the call connection request signal. Here, the screen image displayed on the display unit 140 may also be visually associated with the image arranged on the film layer 170. The screen image and the image arranged on the film layer 170 are described in more detail later in connection with the drawings.

The input unit 120 may include a plurality of alphanumeric and function keys for inputting alphanumeric information and for setting various functions. The function keys may include direction, side, and shortcut keys associated with specific functions. The input unit 120 generates an input signal corresponding to user manipulation for setting and control of the operation of the mobile terminal 100 and sends the generated input signal to the control unit 160. For example, according to user manipulation, the input unit 120 may generate input signals for accepting a received call, making a call to another mobile terminal, ending the current operation of the mobile terminal 100, and turning on the mobile terminal 100, and forward the generated input signals to the control unit 160.

The audio processing unit 130 includes a speaker SPK for outputting incoming and outgoing audio data during a video call, and a microphone MIC for collecting an audio signal such as a voice signal during a video call. An audio signal collected by the audio processing unit 130 may be transmitted to another mobile terminal through the radio frequency unit 110. The audio processing unit 130 may output an audio signal linked with a screen image displayed on the display unit 140. To achieve this, the mobile terminal 100 may pre-store an audio signal that is to be output when the linked screen image is displayed on the display unit 140.

The display unit 140 displays various menus, information input by the user, and information to be provided to the user. For example, the display unit 140 may output various screens related to utilization of the mobile terminal 100, such as an idle screen, menu screen, message composition screen, call handling screen, ending screen and boot screen. The display unit 140 may be realized using a flat display panel based on Liquid Crystal Display (LCD) devices or Organic Light Emitting Diodes (OLED). The display unit 140 may include a display panel 141 and a touch panel 143. If the display unit 140 includes the touch panel 143, then the function of the input unit 120 may be combined with the touch panel 143.

The display panel 141 is layered above or below the touch panel 143, and may output images stored in the storage unit 150. The display panel 141 may output images and messages received from the outside on the screen. Various screens output by the display panel 141 may be composed of screen images pre-stored in the storage unit 150. The pre-stored screen images may be associated with the image arranged on the film layer 170. Screen images output on the display panel 141 are described in more detail later with reference to the drawings.

The touch panel 143 is layered above or below the display panel 141, and may generate a touch event in response to a touch gesture of the user and send the touch event to the control unit 160. The touch panel 143 may be realized using various techniques such as capacitive or resistive sensing. The touch panel 143 may detect a touch event caused by pressure or contact with an object on the surface thereof and identify the coordinates of the touch event, and send the touch event and coordinates thereof to the control unit 160.

The storage unit 150 may store application programs related to an exemplary embodiment of the present invention, screen images to be output to the display unit 140, and key maps, menu maps, and information on a partial touch lock release zone for the touchscreen capability of the display unit 140. The key maps may correspond to various keyboard layouts including 3*4 and QWERTY layouts, and may include a control key map for controlling execution of an activated application program. The menu maps may include a menu map for controlling the execution of the activated application program. The storage unit 150 may include a program region and a data region.

The program region may store an Operating System (OS) for booting and operating the mobile terminal 100, application programs for reproduction of various files, application programs for voice call-related functions, a browser for accessing a web server, application programs for playback of audio data such as Motion Picture Experts Group (MPEG)-2 Audio Layer III (MP3) data, and application programs for viewing still images and moving images. In particular, the program region may store a screen image output control program and a screen image setting control program.

The screen image output control program includes a screen image selection routine for selecting a screen image according to operation of the mobile terminal 100, and a screen image output routine for outputting the selected screen image to the display panel 141. The screen image selection routine may include various subroutines for recognizing specific operating states of the mobile terminal 100 related to, for example, display of the idle screen after booting, call reception, call placement, turning off, and turning on. The screen image output routine may include various subroutines for controlling output of the screen image associated with the operating state to the display panel 141, such as a subroutine to generate Red-Green-Blue (RGB) signals corresponding to the screen image, a subroutine to control output of the RGB signals to the display panel 141, and a subroutine to generate control signals for output of the RGB signals and delivery of the generated control signals to the display panel 141.

The screen image setting control program may include a routine for outputting a menu enabling the user to set screen images to be output to the display unit 140 according to operating states, a routine for selecting one of screen images stored in the storage unit 150 in response to a user input signal carrying index information, and a routine for outputting the selected screen image to the display unit 140 upon activation. The screen image setting control program may further include a preview routine for enabling the user to readily preview a selected screen image according to user manipulation. To achieve this, in response to a screen image selection request, the screen image setting control program may control the display unit 140 to output various screen images as thumbnail images, and, when a thumbnail image is selected, output the corresponding screen image so that the user may examine in advance the level of matching between the selected screen image and the image arranged on the film layer 170.

The data region is an area that stores data generated in the course of using the mobile terminal 100, and may store phonebook information, one or more icons associated with widgets, and various content. In particular, the data region may store screen images that are to be output to the display unit 140 according to operating states of the mobile terminal 100. The screen images to be output may be grouped into multiple image sets such as first and second image sets. When an image set is selected, multiple screen images of the selected image set are set at once. That is, when one image set is selected, the screen images for individual operating states related to display of the idle screen after booting, call reception, call placement, turning off, and turning on are respectively set at once. Here, individual screen images of the first and second image sets may be formed so as to be visually associated with the image arranged on the film layer 170. Additional image sets may be pre-stored in the data region according to terminal design, and other image sets downloaded from a server may be stored in the data region. During image set selection, a particular screen image in the selected image set may be replaced with another screen image according to a user request.

The film layer 170 is configured to be placed on a front surface of the mobile terminal 100, and various images may be arranged in a region of the film layer 170 excluding the region for the display unit 140. The image arranged on the film layer 170 may take the form of an image printed on a film. The film layer 170 may include a transparent protective film zone and an image film zone enclosing the protective film zone to contain a printed image. An adhesive layer may be provided to the back of the film layer 170. The adhesive layer may be formed only on the image film zone (excluding the protective film zone) in the back of the film layer 170. As the film layer 170 is to be attached to the front surface of the mobile terminal 100, it preferably has the same shape as the front surface thereof The adhesive layer may include a strong adhesive to permanently attach the film layer 170 to the front surface of the mobile terminal 100, or may include a relatively weaker adhesive to allow the film layer 170 to be adjusted, removed, or replaced. The relatively weaker adhesive may be formulated so as to leave little or no residue when the film layer 170 is removed or replaced. The film layer 170 may be formed to be smaller than the front surface, or may be formed to be larger than the front surface so as to wrap and be fixed to the side surface of the mobile terminal 100 using the extra portion. Various types of images may be printed on the film layer 170 and these printed images may be visually combined with screen images output from the display unit 140. The film layer 170 may be manufactured to contain index information of the printed image in advance. For example, when the film layer 170 is attached to a piece of cardboard for distribution, index information of the printed image may be recorded at a portion of the cardboard. Alternatively, the index information may be printed at, for example, the edge portion of the film layer 170. This index information may include identification information of the printed image. The user may readily select a screen image matching the image printed on the film layer 170 on the basis of the index information. The index information may also include information to assist the user in accurately positioning the film layer 170 on the front surface of the mobile terminal 100.

The control unit 160 controls supply of power to the components of the mobile terminal 100 for initialization. In particular, the control unit 160 may control a procedure for screen image setting and screen image output. To be more specific, when the mobile terminal 100 is turned on, the control unit 160 completes the boot procedure by displaying the idle screen according to preset schedule information. Here, the idle screen may be composed of a screen image preset by the user. Thereafter, the control unit 160 controls an operation to output preset screen images according to operating states of the mobile terminal 100 related to call reception, call placement, and turning off To achieve this, the control unit 160 may control the storage unit 150 to automatically output the preset screen images to the display unit 140, or may control an operation to access a particular server to find and download a screen image matching the film layer 170 and display the downloaded screen image on the display unit 140.

To support a procedure for screen image setting, the control unit 160 may read the screen image setting control program from the storage unit 150 and execute the same. User interactions with the screen image setting control program are described in more detail with reference to FIG. 3.

As described above, the mobile terminal 100 of an exemplary embodiment of the present invention may output screen images, which are visually associated with the image printed on the film layer 170 arranged on the front surface, to the display unit 140. Hence, the display area for a display screen of the mobile terminal 100 is extended to the entire front surface, and it is possible to employ more diverse screen images.

Figure 2:
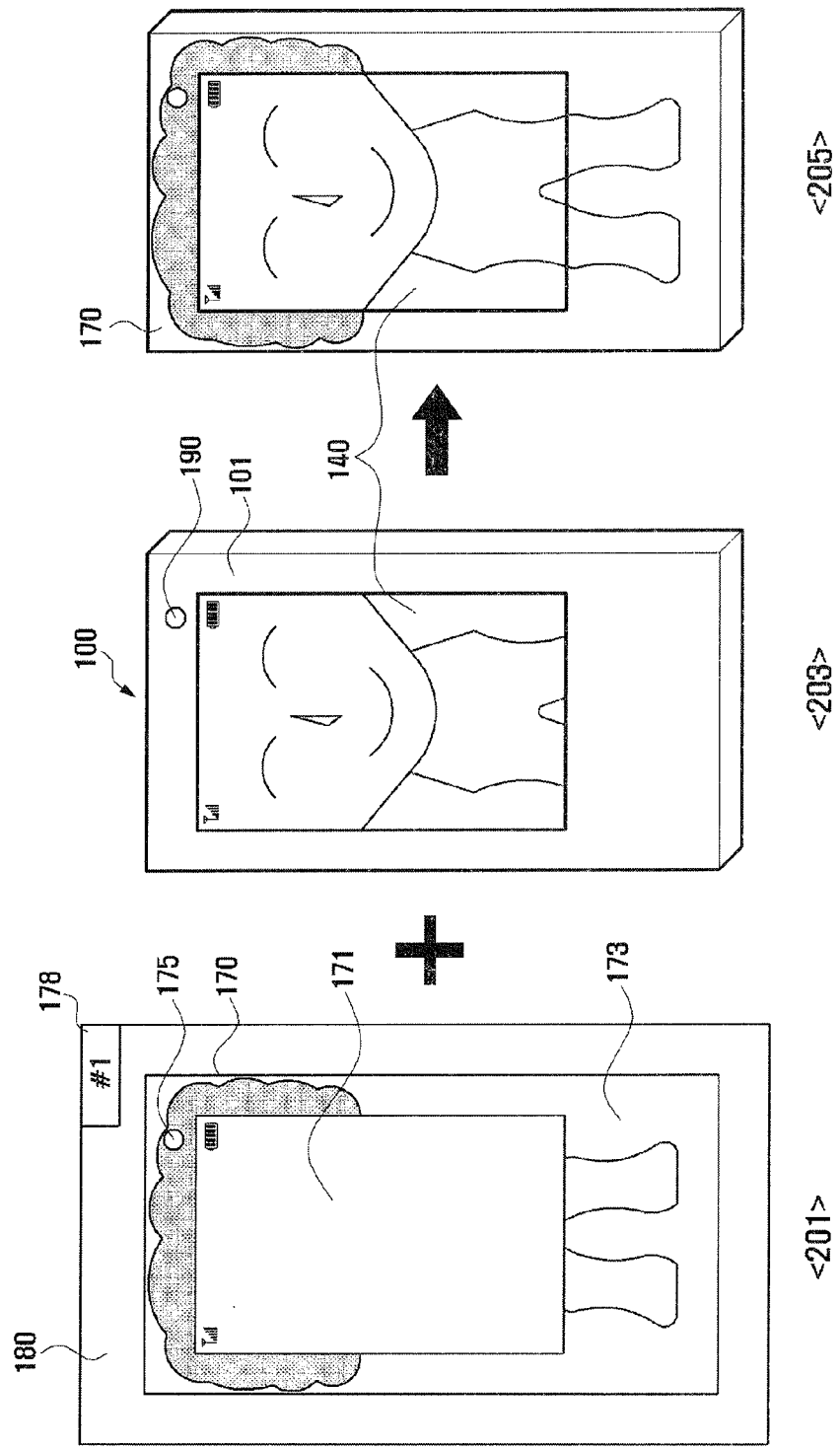
FIG. 2 is illustrates arrangements of images on one surface of a mobile terminal according to an exemplary embodiment of the present invention.

FIG. 2 illustrates arrangements of images on one surface of a mobile terminal according to an exemplary embodiment of the present invention.

Referring to FIG. 2, a piece of cardboard 180 having a film layer 170 and a mobile terminal 100 are provided.

As indicated by reference symbol 203, the mobile terminal 100 includes a region for the display unit 140 and a region for a case 101 enclosing the display unit 140. To support video calls, the mobile terminal 100 may include a camera module 190 placed at a portion of the front surface.

As indicated by reference symbol 201, the piece of cardboard 180 may include a region for the film layer 170 and a region for index information 178. The piece of cardboard 180 preferably includes a surface of vinyl or comparable material so that the adhesive layer placed on the back of the film layer 170 may be easily separated therefrom. As described before, the film layer 170 may include a protective film zone 171 and an image film zone 173. The film layer 170 may further include a hole 175 that is used to accommodate a feature of the mobile terminal 100, such as the camera module 190 for a video call, when attached to the front surface of the mobile terminal 100. If the mobile terminal 100 is equipped with another sensor such as a proximity sensor or an optical sensor, the film layer 170 may further include a corresponding hole through which the sensor is outwardly exposed when film layer 170 is attached to the front surface of the mobile terminal 100.

When the user obtains a piece of cardboard 180 having a film layer 170, the user may separate the film layer 170 from the piece of cardboard 180 and attach the separated film layer 170 to the front surface of the mobile terminal 100. Here, preferably, the film layer 170 is arranged so that the edge thereof is aligned with the front surface of the mobile terminal 100, the protective film zone 171 is matched with the region for the display unit 140, and the hole 175 of the film layer 170 is matched with the camera module 190.

After attaching the film layer 170 to the front surface of the mobile terminal 100, it is preferable to apply a suitable amount of pressure to the image film zone 173 having an adhesive layer so as to firmly attach the film layer 170 to the front surface. Thereafter, as indicated by reference symbol 205, placement of the film layer 170 on the mobile terminal 100 is completed. To facilitate this process, as indicated by reference symbol 203, the user may direct the mobile terminal 100 to select a screen image according to the film layer 170 and output the selected screen image on the display unit 140 in advance. Here, the screen image matching the image printed on the film layer 170 may be searched for on a basis of the index information 178.

Thereby, the mobile terminal 100 may combine the screen image displayed on the display unit 140 with the image printed on the film layer 170, enabling the user to utilize the extended display space.

Figure 3:
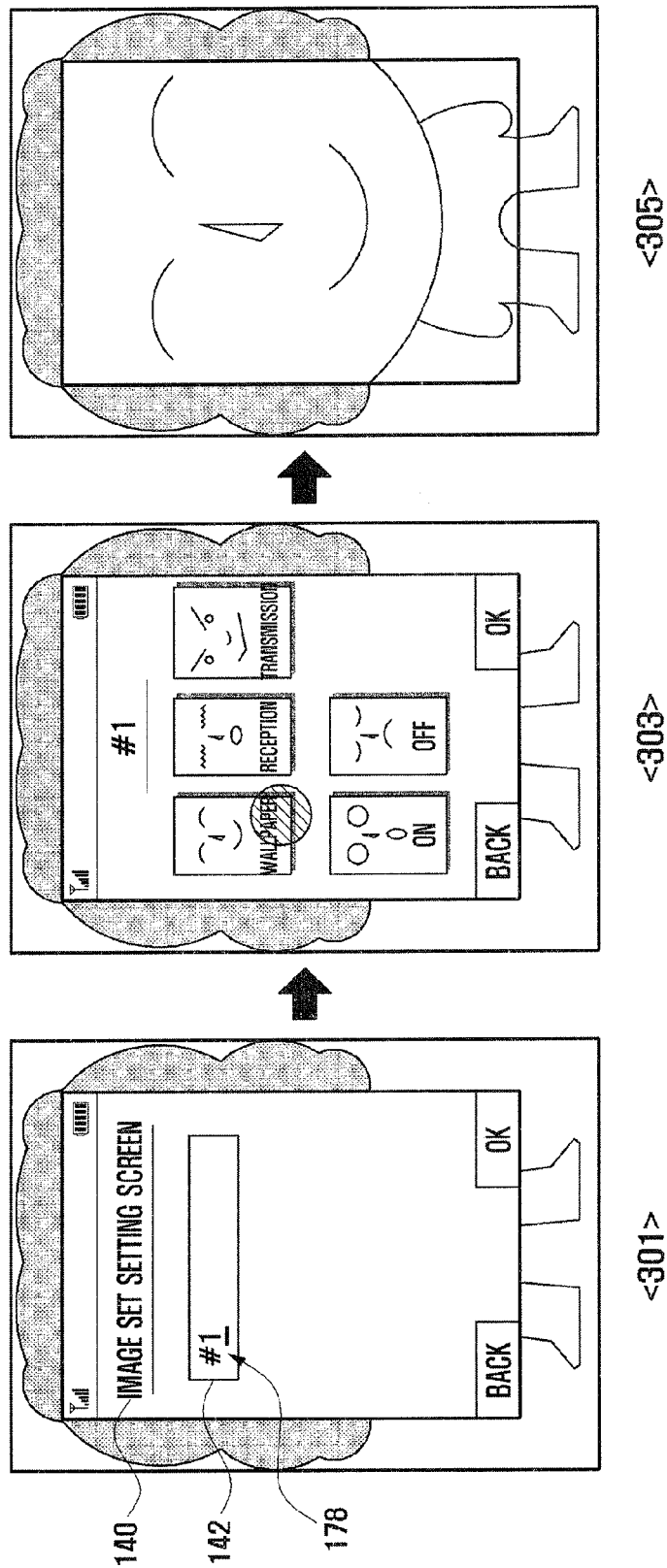
FIG. 3 is illustrates screen image settings for a mobile terminal according to an exemplary embodiment of the present invention.

FIG. 3 illustrates screen image settings in a mobile terminal according to an exemplary embodiment of the present invention. In the description of FIG. 3, the film layer 170 is assumed to be pre-attached to the front surface of the mobile terminal 100. However, exemplary embodiments of the present invention are not limited thereto. That is, the user may set a specific screen image before attaching the film layer 170.

Referring to FIG. 3, the mobile terminal 100 may output a User Interface (UI) screen for screen image setting to the display unit 140. The mobile terminal 100 may provide a menu item for screen image setting, and the user may select this menu item to activate the UI screen for screen image setting. When the user selects the menu item for screen image setting, the mobile terminal 100 outputs a UI screen including an input field 142 for entering index information 178 as indicated by reference symbol 301. Thereafter, the user may enter the index information 178 in the input field 142 through the touch panel 143 displaying a key map on the display panel 141. Here, the mobile terminal 100 may output a key map on the display unit 140. Key map output is not shown for ease of description.

When the "OK" button is entered after the index information 178 is entered in the input field 142, the mobile terminal 100 displays a set of screen images corresponding to the index information 178 as indicated by reference symbol 303. The screen images in the set may, for example, be displayed as thumbnail images indicating operating states.

To form a desired screen such as a wallpaper, when the user selects one of the thumbnail images and activates the preview function or presses an "OK" button, the mobile terminal 100 displays the screen image corresponding to the selected thumbnail image on the display unit 140 as indicated by reference symbol 305. To achieve this, the mobile terminal 100 may provide an icon (not shown) associated with the preview function at a portion of the display unit 140, or may assign a key associated with the preview function to the input unit 120, and the user may select the icon or enter the key to preview the result of applying the selected screen image as indicated by reference symbol 305. When the user accepts the setting of the selected screen image by pressing the "OK" button, the mobile terminal 100 may also display the selected screen image on the display unit 140 as indicated by reference symbol 305. At the step indicated by reference symbol 305, the mobile terminal 100 may also provide a "back" button or "cancel" key to return to the previous step indicated by reference symbol 303. Thereby, the user may evaluate multiple screen images without needing to re-enter the index information 178.

Hereinabove, a description is given of components of the mobile terminal 100 for supporting image display. Next, a description is given of a method of composing screen images utilizing the front surface of the mobile terminal 100.

Figure 4:
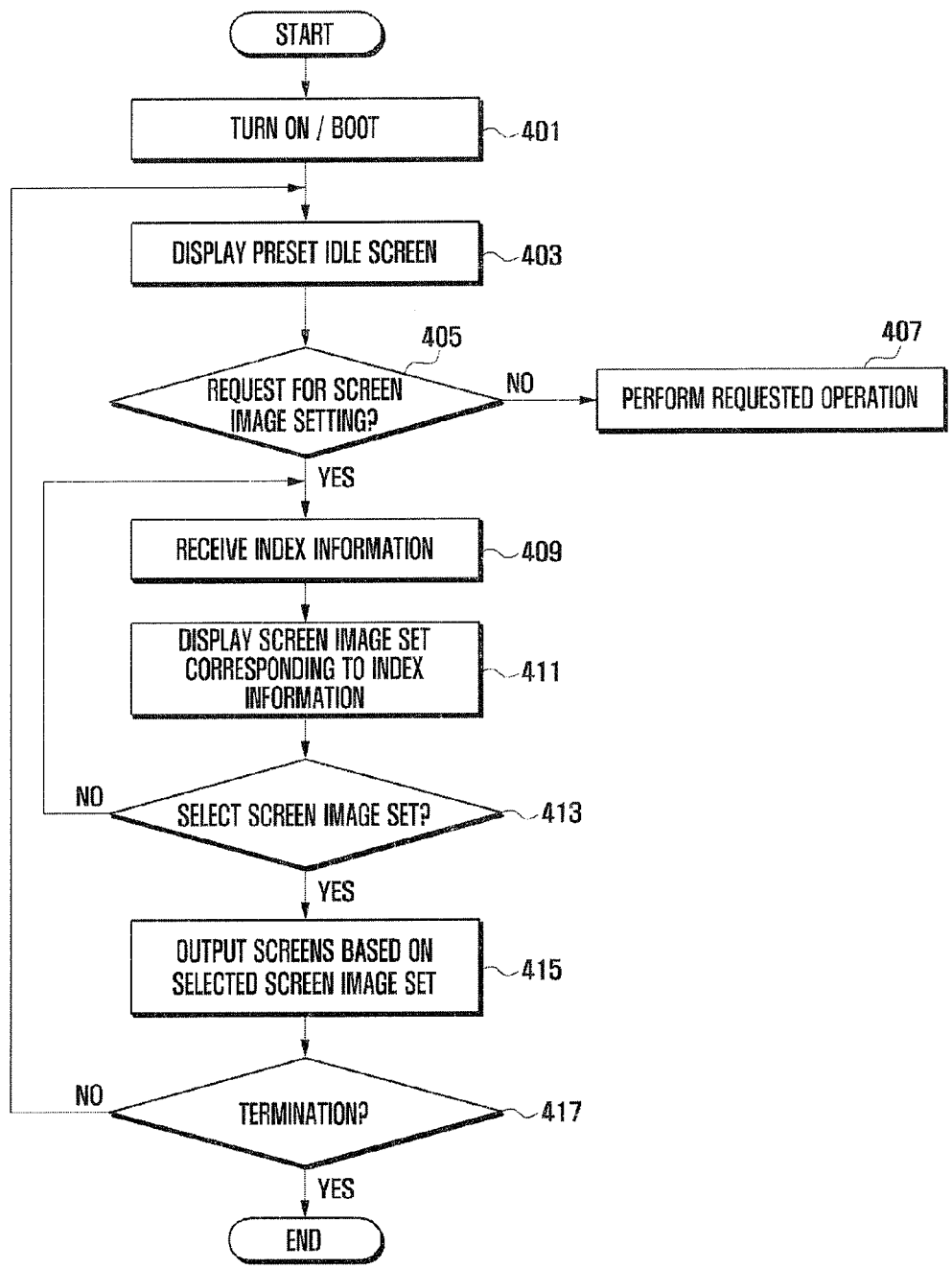
FIG. 4 is a flowchart of a method for image display according to an exemplary embodiment of the present invention.

FIG. 4 is a flowchart of a method for image display according to an exemplary embodiment of the present invention.

Referring to FIG. 4, the mobile terminal 100 is turned on and power is supplied at step 401. Power may be supplied from the battery or a charger. After supply of power, the mobile terminal 100 initializes components thereof and executes a boot procedure.

After booting, the mobile terminal 100 displays a preset idle screen on the display unit 140 at step 403. The idle screen may include a preset screen image. That is, when a particular screen image is stored in the storage unit 150, the mobile terminal 100 may output the stored screen image as the idle screen. Otherwise, the mobile terminal 100 may output a default screen image as the idle screen.

The mobile terminal 100 determines whether an input signal is a request for screen image setting at step 405. An input signal for screen image setting may be generated by the input unit 120 or the touch panel 143. When the input signal is not a request for screen image setting, the mobile terminal 100 performs an operation requested by the input signal at step 407. For example, file playback, file search, broadcast reception, photographing, or call handling may be performed according to a user's input.

When the input signal is a request for screen image setting, the mobile terminal 100 displays a UI screen for screen image setting on the display unit 140 and receives index information at step 409. Here, the user may enter index information recorded in the film layer 170 through the UI screen.

The mobile terminal 100 outputs a screen image set corresponding to the received index information to the display unit 140 at step 411. The screen image set is a set of screen images corresponding to the index information of the film layer 170. Images of the screen image set may be associated with operating states of the mobile terminal 100 related to, for example, call reception, call placement, and turning off The mobile terminal 100 determines whether an input signal for selecting the screen image set is entered by the user at step 413. When an input signal for selecting the screen image set is not entered (for example, the "cancel" button is entered), the mobile terminal 100 returns to step 409 for receiving new index information.

When an input signal for selecting the screen image set is entered, the mobile terminal 100 supports screen output on a basis of the selected screen image set at step 415. That is, screen images matching the image printed on the film layer 170 are output according to operating states of the mobile terminal 100.

The mobile terminal 100 checks whether an input signal for termination is entered at step 417. When an input signal for termination is not entered, the mobile terminal 100 returns to step 403 and displays an idle screen based on the selected screen image set.

As described above, the image display method of an exemplary embodiment of the present invention enables output of screen images matching the image printed on the film layer 170 arranged on the front surface of the mobile terminal 100. In an exemplary embodiment of the present invention, the screen images are output according to operating states of the mobile terminal 100. Screen image setting for various operating states may be performed in units of a screen image set. The mobile terminal 100 may support automatic search for screen images matching the image printed on the film layer 170, enabling easy selection of screen images.

In the above description, screen image setting is performed on the basis of screen image sets stored in the storage unit 150. However, exemplary embodiments of the present invention are not limited thereto. For example, the mobile terminal 100 may perform screen image setting based on a server through automatic search.

To be more specific, to download a screen image set, when the user enters index information of the film layer 170, the mobile terminal 100 may extract a server address corresponding to the index information and connect to the server using the extracted address. The server may send a webpage having means to download screen image sets to the mobile terminal 100, and the mobile terminal 100 may send the index information to the server through the webpage. The server may send a list of screen image sets corresponding to the index information to the mobile terminal 100. The user of the mobile terminal 100 may select one screen image set of the list and send the selection indication to the server, and the server may send the selected screen image set to the mobile terminal 100. The mobile terminal 100 may store the received screen image set in the storage unit 150 and automatically perform screen image setting. That is, when a screen image set is selected and downloaded, the control unit 160 of the mobile terminal 100 controls an operation to set an idle screen, a call handling screen, an ending screen, a start screen, and the like, on a basis of images in the downloaded screen image set.

Although not shown, if necessary, the mobile terminal 100 may further include at least one of a short-range communication module for short-range communication, a data communication interface based on wired and wireless communication, an Internet communication module for Internet access, and a digital broadcast receiving module for playing digital broadcasts. With the digital convergence trend, it should be apparent to those skilled in the art that the mobile terminal 100 of an exemplary embodiment of the present invention may further include a unit comparable to the above-described units, and a unit of the mobile terminal 100 may be removed or replaced with another unit.

The mobile terminal 100 of an exemplary embodiment of the present invention may be a device capable of outputting screen images to the display unit, and may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player such as an MP3 player, a portable game console, a smart phone, a notebook computer, or a handheld computer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal for supporting image display, the terminal comprising:
    a display unit for outputting images according to an operation of the mobile terminal;
    an exterior case for enclosing the display unit;
    a film layer arranged so as to cover the display unit and the exterior case, and comprising an image printed in an area thereof excluding a region corresponding to the display unit;
    a storage unit for pre-storing screen images that are associated with the image printed on the film layer and are to be output to the display unit according to the operation of the mobile terminal; and
    a control unit for controlling an operation to output the screen images stored in the storage unit to the display unit.

2. The mobile terminal of claim 1, wherein the film layer comprises:
    a protective film zone, arranged so as to correspond to the display unit, for protecting the surface of the display unit; and
    an image film zone for enclosing the protective film zone and for containing the printed image.

3. The mobile terminal of claim 1, wherein the storage unit stores at least one set of screen images that are associated with the image printed on the film layer, and wherein different screen images are output according to operating states of the mobile terminal.

4. The mobile terminal of claim 1, wherein the film layer comprises identification information printed at a portion thereof according to the printed image.

5. The mobile terminal of claim 4, wherein, if the identification information is entered, the control unit automatically searches the storage unit for screen images that are associated with the printed image according to the identification information and outputs found screen images.

6. The mobile terminal of claim 4, wherein, if the identification information is entered, the control unit controls an operation to download screen images that are associated with the printed image according to the identification information and automatically applies the downloaded screen images.

7. The mobile terminal of claim 4, wherein, if the identification information is entered, the control unit controls to present a selection of images associated with the printed image according to the identification information.

8. The mobile terminal of claim 7, wherein a user may select an image from the selection of images, and the image selected by the user is then previewed as a full screen preview image.

* * * * *